United States Patent
Zhuge et al.

(10) Patent No.: US 8,090,679 B2
(45) Date of Patent: Jan. 3, 2012

(54) METHOD FOR MEASURING WEB SITE PERFORMANCE

(75) Inventors: Yue Zhuge, Beijing (CN); Kun Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 12/165,600

(22) Filed: Jun. 30, 2008

(65) Prior Publication Data

US 2009/0327353 A1    Dec. 31, 2009

(51) Int. Cl.
*G06F 17/30* (2006.01)
(52) U.S. Cl. .................................. 707/603; 707/736
(58) Field of Classification Search .............. 707/600, 707/999.01, 603, 736
See application file for complete search history.

(56) References Cited

U.S. PATENT DOCUMENTS

| | | | |
|---|---|---|---|
| 6,393,479 B1 | 5/2002 | Glommen et al. | |
| 6,701,363 B1 | 3/2004 | Chiu et al. | |
| 6,738,933 B2 * | 5/2004 | Fraenkel et al. | 714/47 |
| 7,171,406 B2 | 1/2007 | Chen et al. | |
| 2002/0147805 A1 | 10/2002 | Leshem et al. | |
| 2003/0004825 A1 * | 1/2003 | Olson et al. | 705/26 |
| 2003/0131106 A1 | 7/2003 | Kasriel | |
| 2003/0208578 A1 | 11/2003 | Taraborelli et al. | |
| 2005/0165889 A1 | 7/2005 | Muret et al. | |
| 2006/0036400 A1 | 2/2006 | Kasriel et al. | |
| 2007/0011304 A1 | 1/2007 | Error | |
| 2007/0143343 A1 | 6/2007 | Iverson | |

OTHER PUBLICATIONS

Deep Log Analyzer, accessed Oct. 19, 2007 at http://www.deepsoftware.com/website-performance-metrics.asp.
Real Time Web Analytics and Statistics Software, accessed Oct. 19, 2007 at http://www.metasun.com/.
OneStat eBusiness, accessed Oct. 19, 2007 at http://www.onestat.com/html/os_ebusiness.html.

* cited by examiner

*Primary Examiner* — Thu-Nguyet Le

(57) ABSTRACT

An approach for systematically and objectively assessing the health of a web site, or other complex system, using two layers of information. A scoring method is used to provide an objective qualitative judgment, together with detailed areas of analysis if desired. A set of metrics is identified, and a health score for each metric is calculated based upon assessment parameters or angles, based upon the actual data and upon the expectations. The overall health score of the system is then calculated as a composite metric based upon the individual metric health scores. A total score, together with a visual representation of the individual metric scores, is presented to the end user. The two layers of information utilized in the general framework include the domain (which determines the set of metrics and assessment parameters, e.g., web site analysis) and the model (or processing desired, e.g., a scoring model or alert model).

20 Claims, 6 Drawing Sheets

A TABULAR FORM OF THE SCORES IS THE FOLLOWING:

| TRAFFIC HEALTH SCORES | | | |
|---|---|---|---|
| METRICS | ANGLES | SCORE | WEIGHT |
| OVERALL | | 7.1 | |
| PAGE VIEWS | | 9.5 | 0.3 |
| | VALUE | 9.8 | |
| | GROWTH | 9.6 | |
| | PEER | 9.2 | |
| UNIQUE USERS | | 5.7 | 0.3 |
| | VALUE | 7.2 | |
| | GROWTH | 4.4 | |
| | PEER | 5.5 | |
| NUMBER OF SESSIONS | | 4.8 | 0.2 |
| | VALUE | 3.2 | |
| | GROWTH | 7.0 | |
| | PEER | 4.3 | |
| TIME SPENT | | 7.5 | 0.2 |
| | VALUE | 8.0 | |
| | GROWTH | 8.9 | |
| | PEER | 5.6 | |

FIG. 6

METHOD FOR MEASURING WEB SITE PERFORMANCE

BACKGROUND

Web analytics provide analysis on user behaviors while they browse a web site, essentially benchmarking the performance of your website. It covers a few related areas such as analysis about web traffic, web search and ads, and online marketing campaigns. Web analytic systems often provide data and reports with information about events in the listed areas. For example, web traffic analysis may include counts of page views, unique users, referrer information, and the most frequently visited paths.

Various data capture methodologies have developed. Web logs or logfiles may be used to capture data from all web servers, store the data, process the data and create reports for the end user. By default, all requests to a web server (pages, images, pdf's, etc) are logged to a file. However, significant technical expertise is required within the company to analyze and interpret the data captured, i.e., to perform logfile analysis.

Another methodology for collecting data is the use of packet sniffers, using a piece of hardware at the data center, or a piece of software that reroutes all of the traffic from the web server (before it went back to the user requesting the web page) and captures all of the information on the data that the user had requested. Essentially, the web analytics program is integrated into the web server, and collects data by sniffing the network traffic passing between the web server and the outside world.

However, concerns about the accuracy of logfile analysis in the presence of caching, the reluctance to put hardware into the data center to use packet sniffers, and also the desire to be able to perform web analytics as an outsourced service, led to yet another data collection method—the use of JavaScript, or 'page tags', to pass along with the image request certain information about the page and the visitor. This information can then be processed remotely by a web analytics company, and extensive statistics generated (page tagging can be performed in-house, but it is more often provided as a third-party service). The web analytics service also manages the process of assigning a cookie to the user, which can uniquely identify them during their visit and in subsequent visits.

The use of javascript tags, has developed and is currently a standard method of collecting data on the web, wherein a few lines of code sit at the end of each page. A third-party server is notified when a page is rendered by a web browser. In this case, rather than having data sent back to the company and having it stored on web server logs, the data is sent back to the vendor's servers, giving vendors more control on how the data is collected, processed, and the types of reports that could be produced.

Finally, various programs have been developed which collect data through both logfiles and page tagging. By using a hybrid method, these methods aim to produce more accurate statistics than either method on its own. However, these hybrid methods are often complex and difficult to implement.

FIG. 1 illustrates an example of a system 100 for on-demand web analytics (a tracking system). The system 100 is only one example of a suitable web analytics system and is not intended to suggest any limitation as to the scope of use or functionality of the features described herein.

A web server 10 provides web pages, flash, and other local applications 14 that are addressable by URLs 12. Each of these web based resources has an associated tag 16 and 18, respectively, for tracking clicks by users 20. The tags collect the user click information and transmit it over the internet 22 to a web analytics server or tracking server 24.

Web analytics server 24 collects the data received by a web server 19 with a collector component 26, and assembles queues of data in transformer components 28. The transformed data is then loaded into a database 32 by a loader 30. The data in the database is analyzed, checked, and validated over time, then provided to a user using various delivery mechanism such as a browser application, data downloads, data exports, web based API, emails, and other delivery mechanisms from a web reporter server 25 through Internet 22 to a client computer 34.

Web analytics is a relatively mature art, in both business understanding of the area, and technical realizations. However, all current solutions limit themselves to providing metrics, which are numbers such as web site page views or year over year growth of number of users. A site manager makes his or her own judgments about whether the site is doing well. Executives of web related companies often can only rely on summarized numbers to judge and explain their business.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An approach for assessing web site performance and providing an objective, relatively standard overall recommendation is discussed herein. The approach is applicable to other complex systems beyond that of web analytics.

One framework involves the assessment of complex system performance using two layers of information, the domain (e.g., web site analysis, or the set of metrics and assessment parameters) and a model (e.g. scoring, or a function of scores from a set of metrics).

An exemplary architecture includes an analyst console, an analytic system front end, a meta database, a detailed data store, an analytic engine, a data mining engine and an integration engine. This architecture allows for the provision of a domain description, model description and parameters and code libraries. The databases store the descriptions of the framework, including definitions of the metrics, model and model parameters, together with historical data. The processing modules obtain metric values, support measurements for different assessment parameters/angles, interpret the model definitions, and integrate the obtained data. Results, in the form of reports and/or visual display graphs, are provided to the end user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 6 illustrates, in tabular form, each of the individual scores (for each metric, and each angle within each metric);

Like reference numerals indicate like elements in the drawings. Elements are not drawn to scale unless otherwise indicated.

DETAILED DESCRIPTION

A scoring method is described, with the intention to provide an objective, relatively standard recommendation about the healthiness of a web site. The "health scores", which can be reflected as a qualitative judgment, are intended to give analytic users a very high level overview of the business, before they can drill down to the detailed areas of analysis, which may use more sophisticated data mining and data analytic techniques.

Aspects described herein are operational with numerous general purpose or special purpose computing system environments or configurations. Examples of well-known computing systems, environments, and/or configurations that may be suitable for use include, but are not limited to, PCs, server computers, portable and hand-held devices such as personal digital assistants ("PDAs"), mobile phones, smart phones, handheld game devices, tablet PCs or laptop PCs, media centers, multiprocessor systems, microprocessor-based systems, set-top boxes, programmable consumer electronics, network PCs, minicomputers, mainframe computers, electronic game consoles, distributed computing environments that include any of the above systems or devices, and the like.

Aspects herein may be described in the general context of computer-executable instructions, such as program modules, being executed by a computer. Generally, program modules include routines, programs, objects, components, data structures, etc., that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

Figure 1:
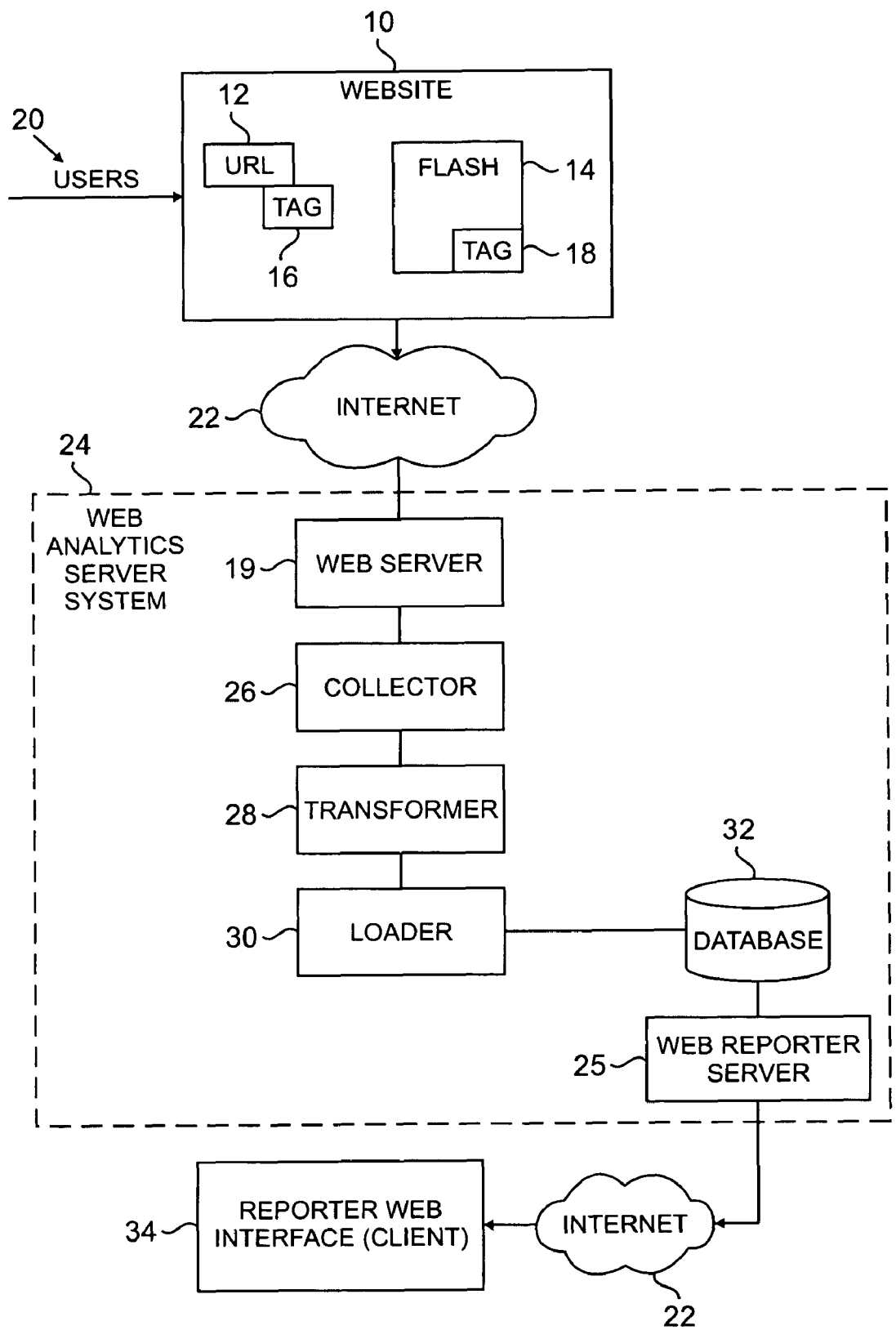
FIG. 1 is a block diagram of a prior art tracking system.
Figure 2:
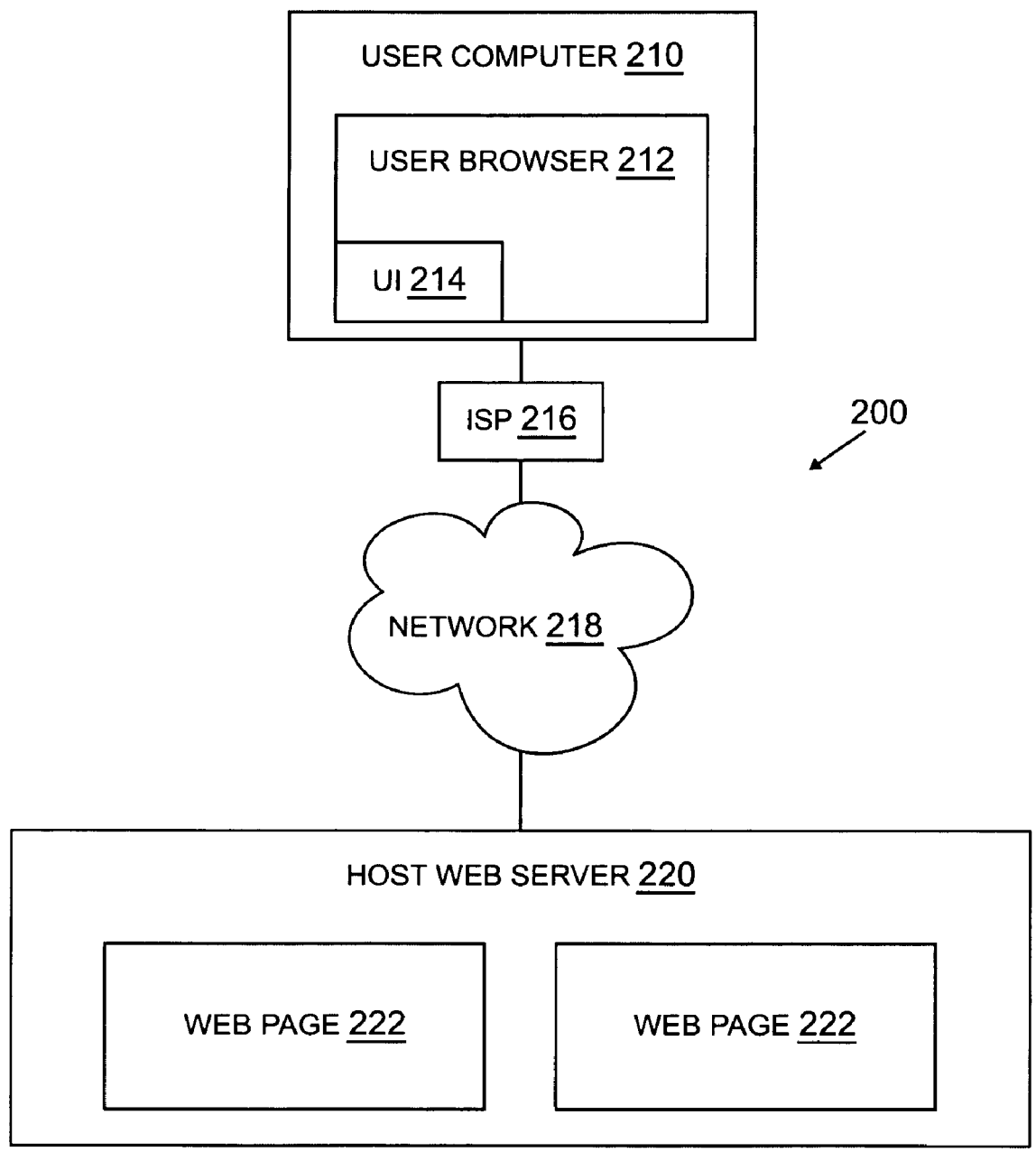
FIG. 2 is a block diagram of an exemplary computing environment suitable for use in implementing embodiments of the present invention.

FIG. 2 illustrates a system 200 that represents an exemplary environment in which the present invention may be practiced. The system 200 includes a computing device 210 having a user browser 212 accessible through a user interface (UI) 214. The computing device 210 may be connected over a network 218 through an Internet Service Provider (ISP) 216. The network 218 includes routers, root servers and virtual name servers, as is known to those of skill in the art. The ISP 216 and the network 218 allow the computing device 210 to interact with a host server 220 through the browser 212. Host 220 can operate to deliver or serve desired web pages 222 to the computing device 210. Other components that are not shown may also be included, but would be known to those of skill in the art.

Figure 3:
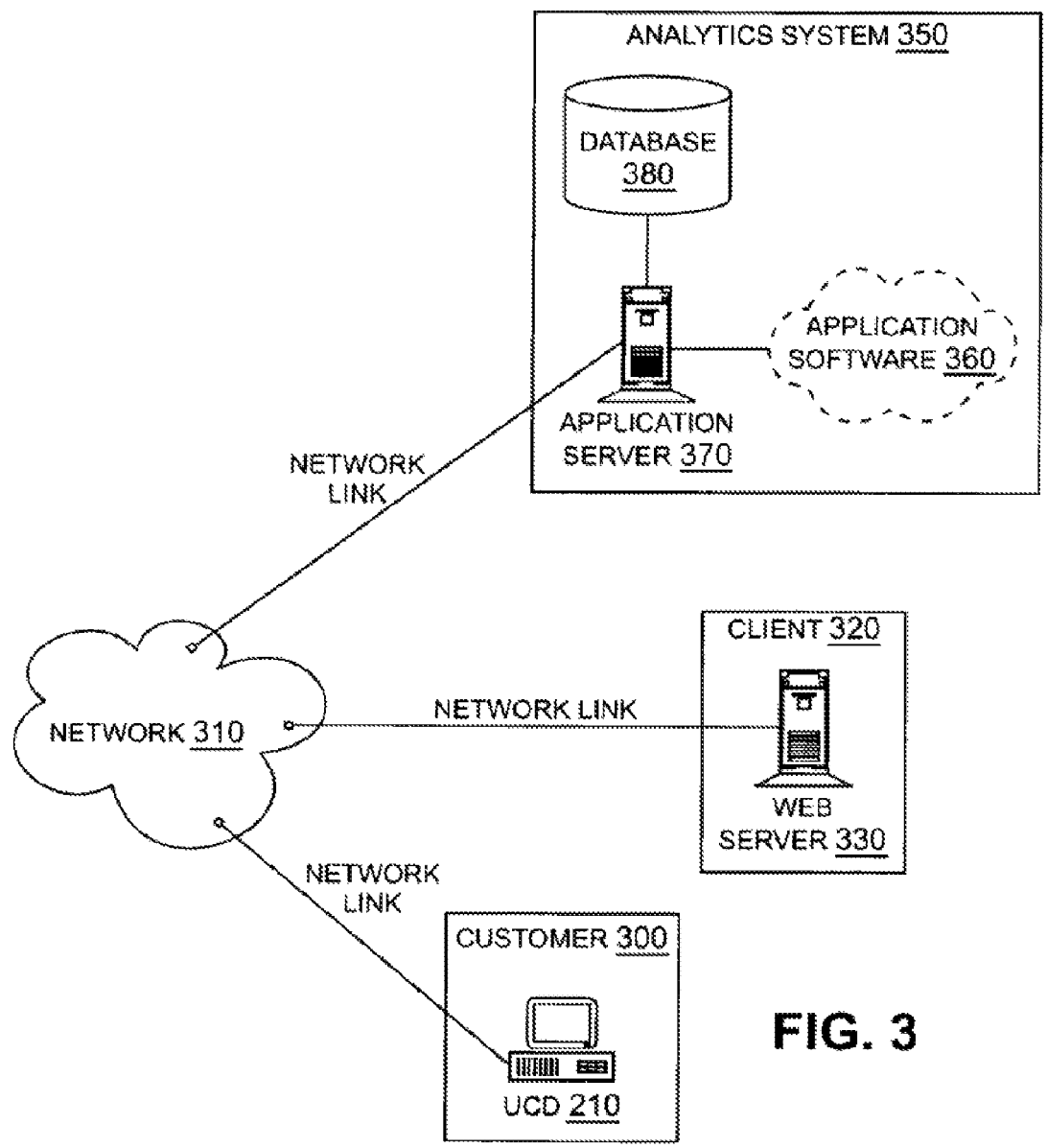
FIG. 3 is a block diagram that depicts a network architecture for a web analytics system in accordance with an embodiment of the present invention.

The system of FIG. 3 illustrates an exemplary environment in which the present invention may be practiced, and specifically includes Web Analytics Server/Module 350. It should be noted that the web analytics module envisioned may be part of the host web server, or may be a separate "hosted" solution, in which the data is collected and processed by the vendor away from the web site owner.

FIG. 3 is a block diagram depicting a network architecture for an analysis system in accordance with an embodiment of the present invention. According to one particular embodiment, when customer 300 visits the website of client 320, user computing device UCD 210 sends and receives via web browser 212, HTTP ("Hypertext Transport Protocol") requests (or any similar protocol requests), to and from web server 330 via the illustrated network links and network 310. As customer 300 proceeds through client 320's website, web server 330 sends information about customer 300's online activity to application server 370 of analytics system 350 (via the illustrated network links and network 310). After receiving this information (e.g., the event-level data), application server 370 employs application software 360 to perform the web site performance measuring method analysis and provide reports based on that analysis.

Throughout this process, transition tables holding resultant data used for providing the reports are generated and stored in database 380. Client 320 may view and interact with the generated report through client 320's web browser (not shown).

The network links shown may include telephone lines, digital subscriber line ("DSL"), cable networks, T1 or T3 lines, wireless network connections, or any other arrangement that provides a medium for the transmission and reception of computer network signals.

Network 310 may include a wide-area network ("WAN"), such as the Internet, and a local-area network ("LAN"), such as an intranet or extranet. It should be noted that, technically, user computing device 210, the illustrated network links, web server 330, application server 370 and any intermediate network components, such as Internet service providers and routers (not shown), are also part of computer network 310 because of their connectivity.

Network 310 may implement any number of communications protocols, including TCP/IP ("Transmission Control Protocol/Internet Protocol"). The communication between user computing device ("UCD") 210, web server 330 and application server 370 may be secured by any Internet security protocol, such as SSL ("Secured Sockets Layer").

Web server 330 and application server 370 each include a processor and memory for executing program instructions, as well as a network interface (not shown), and may include a collection of servers working in tandem to distribute the network functionality and load. In one particular embodiment, application server 370 may include a combination of enterprise servers such as a web application server, a web user interface server and a database server.

As discussed earlier, in one example embodiment of the present invention, Web server 330 tracks and sends customer 300's online activity to application server 370 through the use of event tags placed on certain pages of client 320's website. For example, each event tag may include key-value pairs to capture data about such events as identification of the client site hosting the visitor, the web pages that the visitors (e.g., customer 300) view, the web pages where the visitors place products in their shopping carts, and where the visitors came from before they viewed a tagged web page.

Figure 4:
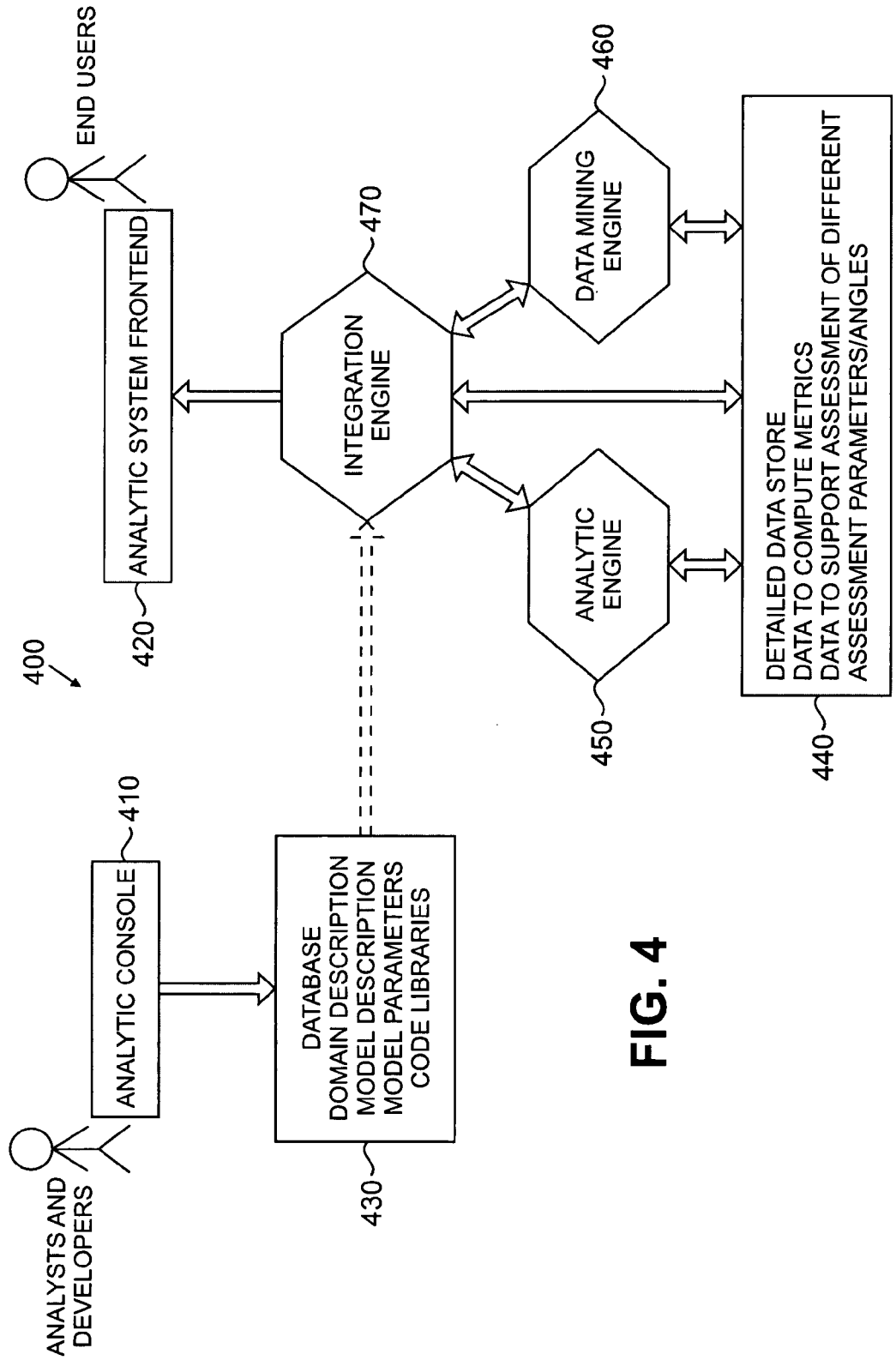
FIG. 4 shows a functional block diagram of an exemplary system architecture that implements the method/system of the present invention.

Referring now to FIG. 4, a more detailed block diagram is illustrated that shows an overall exemplary block architecture diagram 400 that is meant to supplement the discussion of FIG. 3 above. It will be understood and appreciated by those of ordinary skill in the art that the overall architecture 400 shown in FIG. 4 is merely an example of one suitable analytics system architecture and is not intended to suggest any limitation as to the scope of use or functionality of the present invention. Neither should the overall architecture 400 be interpreted as having any dependency or requirement related to any single component or combination of components illustrated therein.

Architecture 400 includes, on the frontend, an analyst console 410 and an analytic system frontend 420. Architecture 400 also includes as data stores, meta database 430 and detailed data store 440. Processing modules in architecture 400 include analytic engine 450, data mining engine 460 and integration engine 470.

Analyst Console 410 provides analysts a manner in which to provide information, such as model definition, model parameters, and expected metric values. In addition, developers provide libraries or code to support some of the computations (e.g., to compute the history of a metric).

At the Analytic System Frontend 420, results are provided to the end user, in the formal of reports or any other display mechanism.

Meta database 430 is a database that stores the descriptions of the framework, including the definitions of the metrics, model, and model parameters.

Detailed Data Store 440 is a database, or another data system, that stores detailed historical data in order to support the analysis. For web traffic analysis, these data may include logs and user information.

Analytic Engine 450 is an analytic engine uses to obtain metric values by interaction with Detailed Data Store 440. It is illustrated in the exemplary architecture as an independent module because, in many cases, an existing analytic engine can be used.

Data Mining Engine 460 is another data processing module used to perform pattern detection, prediction and clustering, by interaction with Detailed Data Store 440, in order to support the measurements for different assessment parameter/angles.

Finally, the Integration Engine module 470, interacts with Meta database 430, Analytic Engine 450, Data Mining Engine 460 and Detailed Data Store 440 to interpret the model definitions, gather data from Analytic Engine 450 and Data Mining Engine 460, and integrate data to support final recommendations. Specifically, results (e.g., the overall Health Score discussed in detail below) may be provided to the end user, in the formal of reports or any other display mechanism, at the Analytic System Frontend 420.

Of course it will be understood and appreciated by those of ordinary skill in the art that the overall architecture 400 shown in FIG. 4 is merely an example of one suitable architecture and is not intended to suggest any limitation as to the scope of use or functionality of the present invention. Neither should the overall architecture 400 be interpreted as having any dependency or requirement related to any single component or combination of components illustrated therein.

Figure 5:
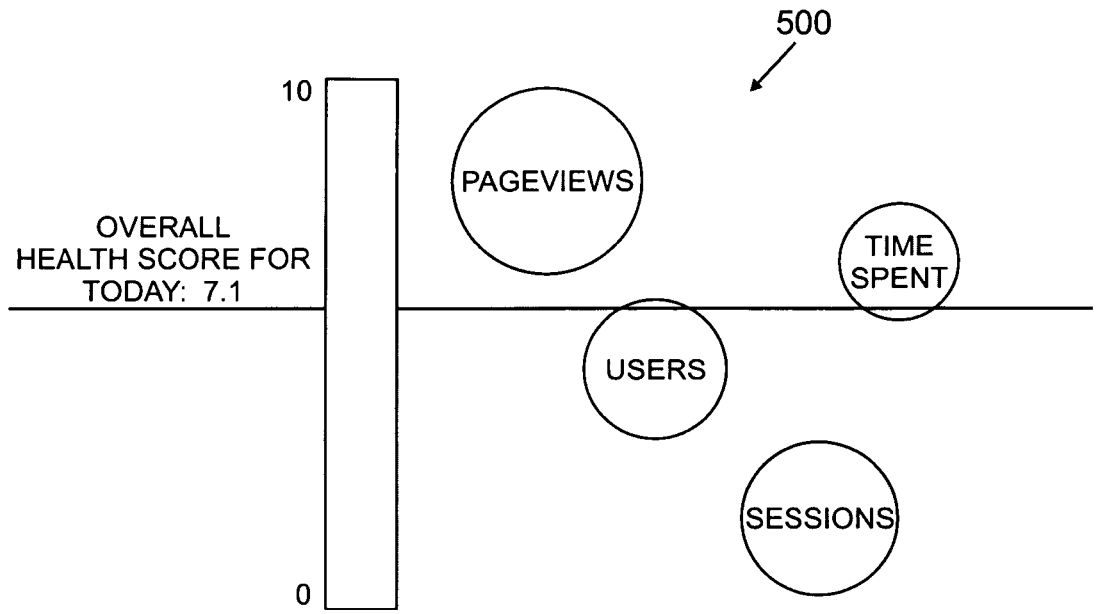
FIG. 5 is a graphical representation of results reported to the end user.

FIG. 5 is a graphical representation 500 of exemplary results that may be reported to the end user. A health score (in this example the scale is from 0 to 10, with 0 being the lowest score and 10 being the highest score) is shown for each individual metric, and the 'overall' health score of 7.1 is illustrated as well. The individual health scores for each individual metric (page views, users, time spent and sessions) is visually displayed in a manner that allows a quick overall assessment of the web site.

A tabular form of each of the individual scores (for each metric, and each angle within each metric) is illustrated in FIG. 6. The user can determine the default illustration for the desired information. For example, the default may be to display the overall health score for the entire site, and allow the user to scroll down to the individual scores for each metric, and then for each angle.

The following is a description of one exemplary traffic health score (HS), which again is shown as a number between 0-10 (with 0 being the lowest score, and 10 being the highest), indicating the assessment of the traffic for the selected web site and timeframe.

First, a set of important, independent metrics with regard to web traffic analysis is identified. They are the key performance indicators of the system. In this example, the following four metrics are used (those skilled in the art will appreciate that these metrics are exemplary only, and that any number of metrics may be implemented):

Page Views (pv): count number of impressions of pages;
Unique Users (uu): unique number of visitors;
Session Counts (sc): a session is sometimes called a visit, defined as logins with less than 30 min idle time. The number of sessions is the Session Count; and
Time spent (ts): average time spent by a user on the site.

The overall Health Score is a composite metric based on the Health Score of these metrics. For this example, we simply use weighted average:

$$HS = W1*HS(pv) + W2*HS(uu) + W3*HS(sc) + W4*HS(ts)$$

The Health Score of each metric is based on the measurement along a set of angles. For example, the following three assessment parameters (or "angles") maybe utilized for the exemplary Health Score:

a. Absolute value: the metric value comparing with its expectations
b. Growth: historical assessment
c. Peers: comparing with peers and competitors.

For simplicity, the Health Score (HS) is calculated to be an average of the assessment from each angle. In our example, we have:

$$HS(pv) = (HS(pv,\text{value}) + HS(pv,\text{growth}) + HS(pv,\text{peer}))/3$$

For each assessment parameter, the assessment is performed based on the actual number and the expectations.

There are many ways one can derive a score for each of the assessment parameters. In the example shown in FIGS. 5 and 6, it is assumed that scores for each (metric, assessment parameter) pair have been obtained.

The framework proposed includes the assessment of complex systems (e.g., web analytic for web sites), and is comprised of two parts, a domain (e.g., web site analysis), and a model (e.g., scoring).

The domain (D) determines the set of metrics (M1, M2 . . . Mm) and the set of assessment parameters (or "angles") (A1, A2 . . . An).

$$D = \{[M1, M2, \ldots, Mm], [A1, A2, \ldots, An]\}$$

The web traffic system domain can be illustrated as the following:

$$D(\text{web traffic}) = \{[pv, uu, sc, ts], [\text{value}, \text{growth}, \text{peer}]\}$$

The model defines a set of the function: F, F' and S(M), S(M,Ak) for all k, defined as the following.

The final output, numeric or not, is defined as a function of scores from a set of metrics:

$$S = F(S(M1), S(M2), \ldots, S(Mm))$$

The score of a metric is defined as a function of its different assessment parameter:

$$S(M)=F'(S(M,A1),S(M,A2),\ldots,S(M,An))$$

The score for each assessment parameter is determined differently for each model or model implementation:

$S(M,Ak)$=specifically defined for metric $M$ and assessment parameter $Ak$

Two example models are now discussed.

Model 1: Scoring Model

The most straight forward implementation of the above system is a scoring model. For a system with i metrics and j assessment parameters:

$$S=\Sigma Wi*S(Mi)/\Sigma Wi \text{ for all } i$$

$$S(M)=\Sigma S(M,Aj)/j \text{ for all } j$$

Again, the score for each assessment parameter is determined differently for each model or model implementation. Also, different parameters, like weights, can be given to produce different sub-models.

Model 2: Alert Model

The alert model is used to surface unexpected values—indicating things that people should be aware of or pay attention.

The following alert model, illustrates the best or worst events that happened in the system that may affect the web site performance. The alert system is a rule-based system with discrete output:

$S=Mi$ if $abs(S(Mi))$ is the largest among all $S(Mi)$ $$S(M)=\Sigma S(M,Aj)/j \text{ for all } j$$

If the function was changed, for example, to $S=Mi$ if abs $(S(Mi))$ is greater than a predefined value, then this model will capture all metrics that has unexpected values.

The method/framework proposed could of course, be utilized with respect to any type of website, including corporate websites, commerce sites, database sites, directory sites, web portals, etc. In addition, the specific model implemented could vary as dictated by the type of site, for example, a static website would perhaps require only a scoring model, wherein a dynamic website, in which information frequently changes (rendering the previous Health Score outdated), would require an alert model in which unexpected values trigger the calculation of a new Health Score.

The general framework does not have requirements on specific domains or models. For example, the domain may be changed from web site analysis to, for example, a search system, while maintaining the scoring model; or the model may be changed to the alert model, while maintaining the domain.

However, the framework must satisfy the following requirements:
1. Ability to define metrics
2. Ability to control contributions from each metric
3. Ability to control contributions from each assessment parameter
4. Ability to produce the same result for a (large enough) subset of data
5. Ability to handle missing information. Ability to disable any metric, any assessment parameter without disrupting the balance of the system.
6. Ability to handle anomalies in data (noise in the data)

Figure 7:
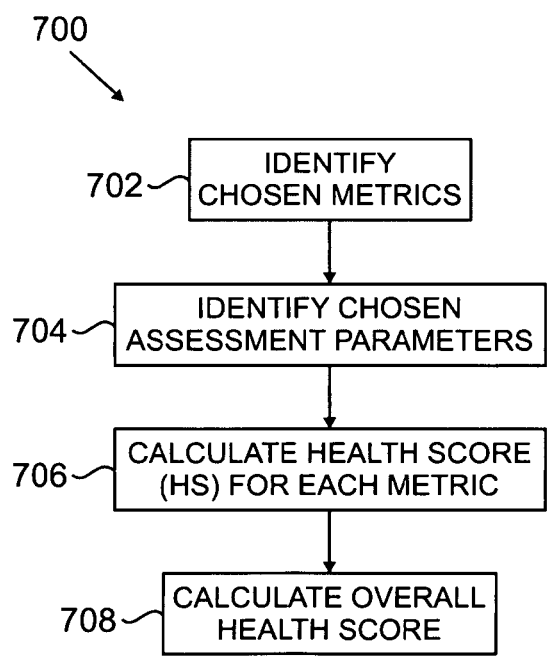
FIG. 7 is a flowchart of an illustrative method for determining a score indicating an assessment of traffic for a selected website over a selected timeframe.

FIG. 7 is a flowchart 700 of an exemplary method for measuring web site performance. The method shown in FIG. 7 may be implemented in the proposed architecture shown and discussed previously in connection with FIG. 4. Unless specifically stated, the method is not constrained to a particular order or sequence. In addition, some of the described steps or elements can occur or be performed concurrently.

The method begins at step 702, where independent metrics with regard to web traffic analysis are identified (as discussed in greater detail above, these metrics may include page views (pv), unique users (uu), session counts (sc), and time spent (ts)).

The method continues at step 704, where a set of assessment parameters (or "angles") are chosen. These assessment parameters can include, for example, absolute value (i.e., the metric value compared with its expectations), growth (i.e., a historical assessment), and peers (i.e., comparing the metric with peers and competitors).

The Health Score for each identified metric, is then calculated in step 706. This calculation may be, for example, an average of the Health Score assessment for each assessment parameter (in which case the Health Score HS for the page views metric would be calculated as HS(pv)=(HS(pv,value)+HS(pv,growth)+HS(pv,peer))/3.

Finally, the overall Health Score HS is calculated in step 708 as a weighted average (for example) of each Health Score calculated for each metric (i.e., the health score for page views (pv) is weighted W1, while the health score for unique users (uu) is weighted W2):

$$HS=W1*HS(pv)+W2*HS(uu)+W3*HS(sc)+W4*HS(ts)$$

One example of an implementation could include a framework for CNN.com web traffic information. Assuming that CNN has a number of "sub sites", these sub-sites are considered to be separate, independent smaller web sites. The page view and unique user information is obtained from an existing CNN web analytic system. For the three assessment parameters or angles, the detailed web logs are used to obtain historical information. The growth for each sub site is then evaluated, and the number of sub sites as peers of each other. Their performance among the group is used to determine the assessment for the assessment parameter/angle of peers.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

One or more features described herein may be embodied in computer-executable instructions (i.e., software) stored in RAM, non-volatile memory, or any other resident memory. Generally, software modules include routines, programs, objects, components, data structures, etc. that perform particular tasks or implement particular abstract data types when executed by a processor in a computer or other device. The computer executable instructions may be stored on a computer readable medium such as one or more hard disks, portable storage media (e.g., CD-ROM, DVD, disk, etc.), solid state memory, RAM, etc. As will be appreciated by one of skill in the art, the functionality of the software modules may be combined or distributed as desired in various embodiments. In addition, the functionality may be embodied in whole or in part in firmware or hardware equivalents such as application specific integrated circuits ("ASIC"), field programmable gate arrays ("FPGA"), and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a score indicating an assessment of web traffic for a selected website over a selected timeframe, the method comprising:
identifying a plurality of independent metrics with regard to web traffic, each metric indicating a performance indicator of the selected website;
receiving user input including an expected metric value for each metric of the plurality of metrics;
obtaining, from a data store, historical data including web traffic information for the selected website and web traffic information for a peer website;
evaluating the web traffic information for the selected website to determine an actual metric value for each of the plurality of metrics with regard to the selected website;
evaluating the web traffic information for the peer website to determine a corresponding metric value for each of the plurality of metrics with regard to the peer website;
calculating, in accordance with a model, a parameter health score for each of a plurality of assessment parameters for each metric, wherein the assessment parameters provide different assessments of each metric based upon the actual metric value for each metric, the different assessments including:
a value assessment of the metric that compares the actual metric value for the metric against the expected value for the metric,
a historical assessment of the metric that compares the actual metric value for the metric against historical data for the metric, and
a peer assessment of the metric that compares the actual metric value for the metric to a corresponding metric value with regard to the peer website;
calculating, in accordance with the model, a metric health score for each metric of the plurality of metrics based upon averaging the parameter health scores calculated for the plurality of assessment parameters for each metric; and
determining, in accordance with the model, a composite overall health score assessing web traffic for the selected website based upon the metric health scores calculated for the plurality of metrics.

2. The method of claim 1, wherein:
the model is a scoring model having a weighted average function, and
the composite overall health score is determined by using the metric health scores calculated for the plurality of metrics as inputs to the weighted average function of the scoring model.

3. The method of claim 1, wherein said metrics include page views, unique users, session counts, and time spent on the selected website.

4. The method of claim 1, wherein said historical assessment measures growth of number of users.

5. The method of claim 4, wherein:
the peer assessment compares growth of number of users for the selected website to growth of number of users for the peer website.

6. The method of claim 1, wherein:
the model is an alert model having a rule based function, and
the composite overall health score is determined by using the metric health scores calculated for the plurality of metrics as inputs to the rule based function of the alert model.

7. The method of claim 1, wherein the parameter health score for each assessment parameter for each metric is calculated based upon the actual metric value for the metric and the expected metric value for each metric.

8. The method of claim 1, further comprising:
providing a visual graph including the composite overall health score for the selected website to a display.

9. The method of claim 8, wherein the metric health scores calculated for each of the plurality of metrics are included in the visual graph.

10. The method of claim 8, wherein the composite overall health score for the selected website is determined according to a scoring model when the selected website is a static website and determined according to an alert model when the selected website is a dynamic website.

11. The method of claim 8, wherein the composite overall health score, the metric health scores, the parameter health scores are graphically displayed in a tabular form to an end user.

12. A computer storage medium storing computer-executable instructions that, when executed by a processor, implement a framework for assessing performance of a server system over a period of time, the framework comprising:
a domain dictating a set of independent metrics and assessment parameters for each metric of the set of metrics; and
a model for interpreting the set of metrics and assessment parameters in the domain, wherein:
the framework includes the ability to define the metrics and the ability to control contributions from each metric and from each assessment parameter,
the model is used to calculate a parameter health score for each assessment parameter, a metric health score for each metric, and a composite overall health score for the server system,
the assessment parameters provide different assessments of each metric based upon an actual metric value for each metric,
the different assessments include a value assessment of the metric that compares the actual metric value for the metric against an expected value for the metric, a historical assessment of the metric that compares the actual metric value for the metric against historical data for the metric, and a peer assessment of the metric that compares the actual metric value for the metric to a corresponding metric value with regard to a peer server system,
the metric health score for each metric is based upon averaging the parameter health scores calculated for the assessment parameters for each metric, and
the composite overall health score is calculated based upon the metric health scores calculated for the set metrics.

13. The computer storage medium of claim 12, wherein said domain comprises web site analysis.

14. The computer storage medium of claim 12, wherein said model comprises one or more of a scoring model and an alert model.

15. The computer storage medium of claim 14, wherein when said model comprises a scoring model, different parameters are used to produce different sub-models.

16. A system architecture for assessing performance of a server system over a selected timeframe, the system architecture comprising:

a front end for receiving inputs and presenting final results to end users, the inputs including a domain description, model definitions of a model, model parameters of the model, expected metric values, and libraries to support computations;

data stores for storing data including input received from the front end, historical data, data to compute metrics, and data to support assessment of assessment parameters for each metric; and processing modules for:

obtaining actual metric values for a plurality of independent metrics, calculating, in accordance with the model, a parameter health score for each assessment parameter for each metric, wherein the assessment parameters provide different assessments of each metric based upon the actual metric value of each metric, the different assessments including a value assessment of the metric that compares the actual metric value for the metric against an expected value for the metric, a historical assessment of the metric that compares the actual metric value for the metric against historical data for the metric, and a peer assessment of the metric that compares the actual metric value for the metric to a corresponding metric value with regard to a peer server system, calculating, in accordance with the model, a metric health score for each metric based upon averaging the parameter health scores calculated for the assessment parameters for each metric, and determining, in accordance with the model, a composite overall health score for the server system based upon the metric health scores calculated for the metrics.

17. The system architecture of claim 16, wherein said front end includes a display mechanism on which the final results are presented.

18. The system architecture of claim 16, wherein the domain description determines a set of metrics and a set of assessment parameters for each metric.

19. The system architecture of claim 16, wherein the domain comprises web site analysis, and the model comprises a scoring model.

20. The system architecture of claim 16, wherein the domain comprises web site analysis, and the model comprises an alert model.

* * * * *